(12) United States Patent
Wadsworth

(10) Patent No.: US 10,579,498 B2
(45) Date of Patent: Mar. 3, 2020

(54) DEBUGGING TOOL FOR A JIT COMPILER

(71) Applicant: Microsoft Technology Licensing LLC., Redmond, WA (US)

(72) Inventor: Brandon Scott Wadsworth, Woodinville, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 200 days.

(21) Appl. No.: 15/224,586

(22) Filed: Jul. 31, 2016

(65) Prior Publication Data

US 2018/0032420 A1 Feb. 1, 2018

(51) Int. Cl.
G06F 9/44 (2018.01)
G06F 11/36 (2006.01)
G06F 8/41 (2018.01)

(52) U.S. Cl.
CPC ............. *G06F 11/362* (2013.01); *G06F 8/41* (2013.01); *G06F 11/3688* (2013.01)

(58) Field of Classification Search
CPC ........................................................ G06F 8/41
See application file for complete search history.

(56) References Cited

U.S. PATENT DOCUMENTS

| 6,543,011 | B1 | 4/2003 | Schumacher et al. |
|---|---|---|---|
| 6,718,535 | B1 | 4/2004 | Underwood |
| 7,380,235 | B1 | 5/2008 | Fathalla |
| 7,406,684 | B2 | 7/2008 | Ogata et al. |
| 8,694,967 | B2 | 4/2014 | Grieves et al. |
| 2005/0177821 | A1* | 8/2005 | Ogata ................ G06F 11/3612 717/148 |
| 2009/0271775 | A1* | 10/2009 | Barsness ................ G06F 8/41 717/151 |
| 2010/0313079 | A1* | 12/2010 | Beretta ................ G06F 9/5055 714/48 |
| 2011/0078666 | A1 | 3/2011 | Altekar |
| 2011/0296385 | A1* | 12/2011 | Wielaard ............... G06F 11/362 717/124 |
| 2012/0304160 | A1* | 11/2012 | Soeder ................ G06F 9/4426 717/148 |

(Continued)

OTHER PUBLICATIONS

Ogata, et al., "Replay Compilation: Improving Debuggability of a Just-in-Time Compiler", In Proceedings of the 21th Annual ACM SIGPLAN Conference on Object-Oriented Programming, Systems, Languages, and Applications, Oct. 22, 2006, pp. 241-251.

(Continued)

*Primary Examiner* — Hang Pan

(57) ABSTRACT

A JIT compiler is debugged by comparing the native code it generates with the native code generated from a reliable JIT compiler. The different compilations are performed using the same input data. The input data is recorded by intercepting the communication exchanges between a runtime environment and the reliable JIT compiler during the compilation of a program. The input data of each communication is stored using a key based on at least one parameter in an API call from a JIT compiler to the runtime environment. A debugging tool is then used to initiate the compilation of a method using a JIT compiler under test using the previously recorded input data.

20 Claims, 11 Drawing Sheets

(56) References Cited

U.S. PATENT DOCUMENTS

| | | | |
|---|---|---|---|
| 2013/0283243 A1* | 10/2013 | Bates et al. | G06F 11/3624 717/129 |
| 2014/0282555 A1 | 9/2014 | Daudel et al. | |
| 2014/0304687 A1 | 10/2014 | Hobbs et al. | |
| 2015/0026666 A1* | 1/2015 | Tojo | G06F 11/3636 717/128 |

OTHER PUBLICATIONS

"IDG Contributor Network: Improve Your Application Startup Time Using Multicore Jit", Retrieved on: May 31, 2016 Available at: http://myinforms.com/en-us/a/16801315-idg-contributor-network-improve-your-application-startup-time-using-multicore-jit/.

Hu, et al., "Versatile yet Lightweight Record-and-Replay for Android", In Proceedings of ACM SIGPLAN International Conference on Object-Oriented Programming, Systems, Languages, and Applications, Oct. 25, 2015, pp. 976-993.

Sen, et al., "Jalangi: A Selective Record-Replay and Dynamic Analysis Framework for JavaScript", In Proceedings of the 9th Joint Meeting on Foundations of Software Engineering, Aug. 18, 2013, pp. 488-498.

Knezevic, et al., "JIT Compiler Structure", Retrieved on: May 31, 2016 Available at: https://github.com/dotnet/coreclr/blob/master/Documentation/botr/ryujit-overview.md.

"Using record and playback", Retrieved on: May 31, 2016 Available at: https://www.adobe.com/content/dam/Adobe/en/devnet/enterprise-platform/digtalLearning/pdfs/documentServices/adep_documentservices_201110_topic_using_record_and_playback.pdf.

Bray, Brandon, "An easy solution for improving app launch performance", Published on: Oct. 18, 2012 Available at: https://blogs.msdn.microsoft.com/dotnet/2012/10/18/an-easy-solution-for-improving-app-launch-performance/.

Choi, et al., "Deterministic Replay of Java Multithreaded Applications", In Proceedings of ACM SIGMETRICS Symposium on Parallel and Distributed Tools, Aug. 1998, pp. 1-12.

Cierniak, et al., "Practicing JUDO: JavaTM Under Dynamic Optimizations", In Proceedings of the ACM SIGPLAN Conference on Programming Language Design and Implementation, Jun. 18, 2000, pp. 13-26.

Yoshikawa, et al., "Random Program Generator for Java JIT Compiler Test System", In Proceedings on Third International Conference on Quality Software Nov. 6, 2003, 5 Pages.

"International Search Report and Written Opinion Issued in PCT Application No. PCT/US2017/043188", dated Oct. 24, 2017, 14 Pages.

Suganuma, et al., "Overview of the IBM Java Just-In-Time Compiler", In Journal of IBM Systems Journal, vol. 39, Issue 1, Jan. 2000, pp. 175-193.

\* cited by examiner

DEBUGGING TOOL FOR A JIT COMPILER

BACKGROUND

Field

The present embodiments generally relate to the area of computer systems and concerns software development and testing techniques for testing the behavior of compilers and verifying their operation. In particular, the behavior of a just-in-time (JIT) and/or ahead-of-time (AOH) compiler is tested by analyzing the native codes generated from various compilations using the same input data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A JIT compiler is debugged or tested by analyzing the native code that the JIT compiler generates. The native code generated from a JIT compiler under test is compared with the native code that is generated from a JIT compiler that produces reliable native code. In order to analyze these codes, both JIT compilations are performed using the same input data and program. The differences between the native code generated from the reliable JIT compiler is compared with the native code generated from the JIT compiler under test and these differences are used to determine the source of problems in the JIT compiler under test.

In order to utilize the same input data, the input data is recorded during an initial JIT compilation of a method with the reliable JIT compiler. The input data comes from a runtime environment which calls a JIT compiler to generate the native code for a specific method. The communication exchange between the JIT compiler and the runtime environment is intercepted in order to record the input data.

A debugging tool is used to initiate the JIT compilation of a method in an environment that treats the JIT compiler as a stand alone tool that operates outside of the runtime environment. This is accomplished by configuring the debugging tool to intercept the communications intended for the runtime environment from the JIT compiler and to respond with the input data requested by the JIT compiler.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
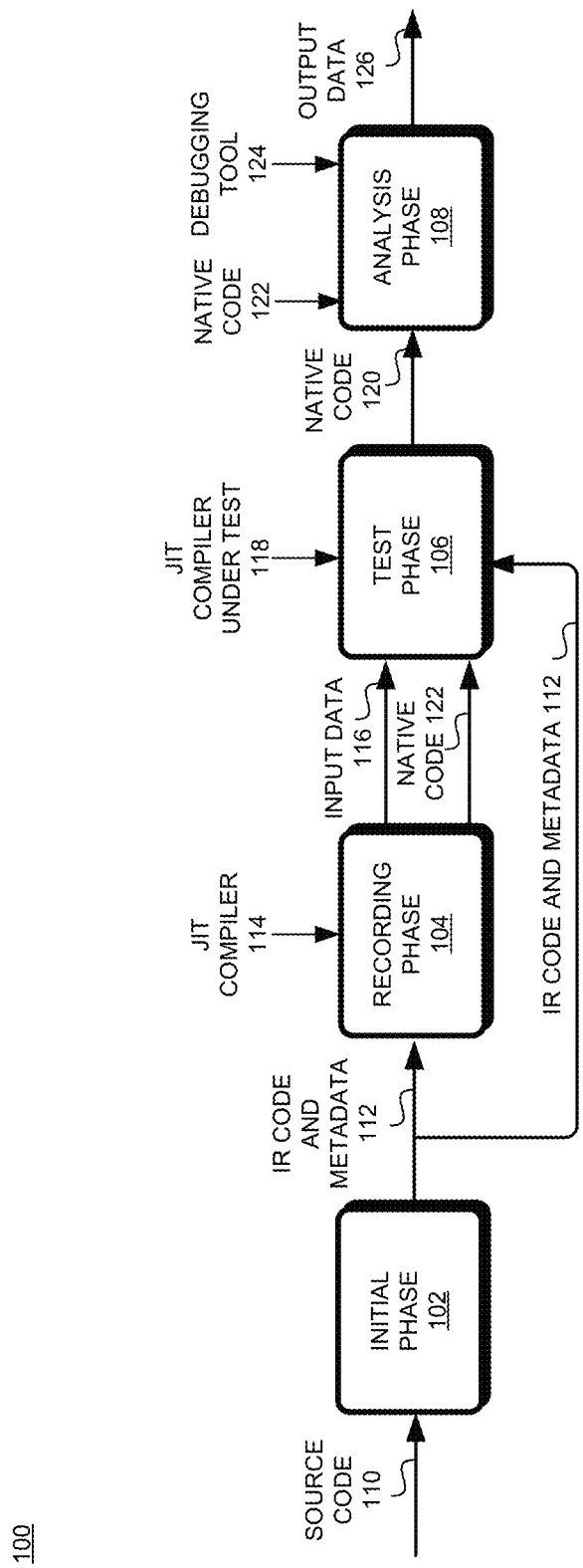
FIG. 1 is a block diagram illustrating the various phases used to record the input data and debug a JIT compiler.

Compilation is the process of translating source code written in a programming language into the machine or native code of a targeted architecture. A static compiler performs this translation before the computer program executes and generates executable code prior to the execution of the program. A JIT compiler, often referred to as a dynamic compiler, transforms an intermediate representation of the computer program into native code during execution of the computer program. The intermediate representation of the computer program is a machine and language independent version of the source code that is generated by a language compiler.

A JIT compiler operates within a runtime environment (i.e., language virtual machine, back end compiler) that manages execution of the computer program. The runtime environment accepts an intermediate code representation ("IR") of a program and invokes the JIT compiler to transform the intermediate representation of a method of the program into native code when the method is called during execution of the program.

JIT compilation can be beneficial over static compilation for several reasons. With JIT compilation, only code that is actually used is compiled thereby reducing memory usage. Also, JIT compilation performs the compiler optimization of inlining from external sources or dynamically linked libraries (i.e., .dll) more effectively which results in faster executable code. Furthermore, code that is executed together will be located within the same memory locality thereby reducing the number of memory page faults.

However, debugging a JIT compiler is more difficult than debugging a static compiler. A static compiler may be able to produce a diagnostic trace of the execution of the static compiler with the same input source code which can be used to discover the source of the problem. This same approach does not work well with a dynamic compiler, such as a JIT compiler, where the compilation depends on the same input data to detect a problem. A JIT compiler is not a standalone tool rather part of a runtime environment that invokes the JIT compiler while executing the program. The input data that is used by the JIT compiler is known by the runtime environment and stored in internal data structures that are discarded when the runtime environment terminates.

The subject matter disclosed herein overcomes this obstacle by recording the input data when the input data is exchanged between a JIT compiler and the runtime environment during compilation. The input data includes information regarding the target method such as the memory location of the IR of the method, the method signature, type information pertaining the method's arguments or parameters, the field layout of the class, the class handle for an argument as well as other types of data.

The input data that a JIT compiler needs from a runtime environment varies between the various types of JIT compilers. JIT compilers may perform different optimizations and analyses thereby requiring different types and amounts of input data. In one aspect of the subject matter, the debugging tool may obtain additional data from the runtime environment which is recorded during a compilation even though the input data was not requested during the compilation. This is because the JIT compiler used to record the input data is often different from the JIT compiler under test. This additional input data is collected during the recording phase in anticipation of this information being needed in a subsequent compilation with different type of JIT compiler.

A debugging tool is used to record and store the input data for later use in a subsequent compilation of a JIT compiler under test. The debugging tool compares the native code generated by the JIT compiler under test with reliable native code for the same methods using the same input data. If the instructions in both native code files match, then it is assumed that the JIT compiler under test is producing reliable native code. Otherwise, when the instructions in both native code files differ, the native code generated from the JIT compiler under test is further analyzed to determine the source of the problem. Attention now turns to a more detailed description of the aspects of this technique.

The Debugging Tool

FIG. 1 shows an exemplary configuration 100 of the phases of a process embodied in a system and device that performs the recording of input data for a JIT compilation in order to debug and analyze a JIT compiler. In one aspect of the subject matter disclosed herein, the process includes an initial phase 102, a recording phase 104, a test phase 106, and an analysis phase 108.

In the initial phase 102, source code 110 written in a programming language is compiled by a language compiler associated with the programming language. The language compiler generates an intermediate code representation ("IR") and metadata 112. The IR may be represented in bytecodes, common intermediate language ("CIL"), GNU register transfer language ("GNU RTL"), parse tree, tree representation, or the like. This IR and metadata 112 is used in the compilation of the methods in the source code into native code. In the recording phase 104, the IR is compiled by a runtime environment (not shown) that includes a JIT compiler 114 and a runtime execution engine (not shown). The output of the recording phase 104 is the input data 116 and native code 122. A runtime environment records the communication exchanges between the runtime execution engine and the JIT compiler 114 in order to preserve the input data used in the compilation. This input data 116 is stored into dictionaries (not shown) and used in the test phase 106.

In a test phase 106, the recorded input data 116 is used to compile one or more methods of the IR 112 using a second JIT compiler or JIT compiler under test 118. The JIT compiler under test 118 may be a different JIT compiler than the JIT compiler used to generate the recorded input data 116. The JIT compiler under test 118 is being analyzed for generating erroneous code, poorly optimized code, and the like, through the native code 120 that it generates.

In the analysis phase 108, a debugging tool 124 compares the native code 120 generated from the JIT compiler under test 118 against the native code 122 generated for the same method generated from a reliable JIT compiler. A reliable JIT compiler is a JIT compiler that produces error-free native code. The code comparison is used as a means to debug the JIT compiler under test 118. The difference in the instructions generated by the two different JIT compilers can be used to diagnose the source of a problem within the JIT compiler under test 118. The analysis phase 108 generates output data 126 indicating the differences between the instructions in the two native codes which may then be used to determine the source of any problems with the JIT compiler under test. The output data 126 may be displayed to a developer on a display, stored in a file, or generated in any format suitable to convey the results of the analysis to an intended user.

Figure 2:
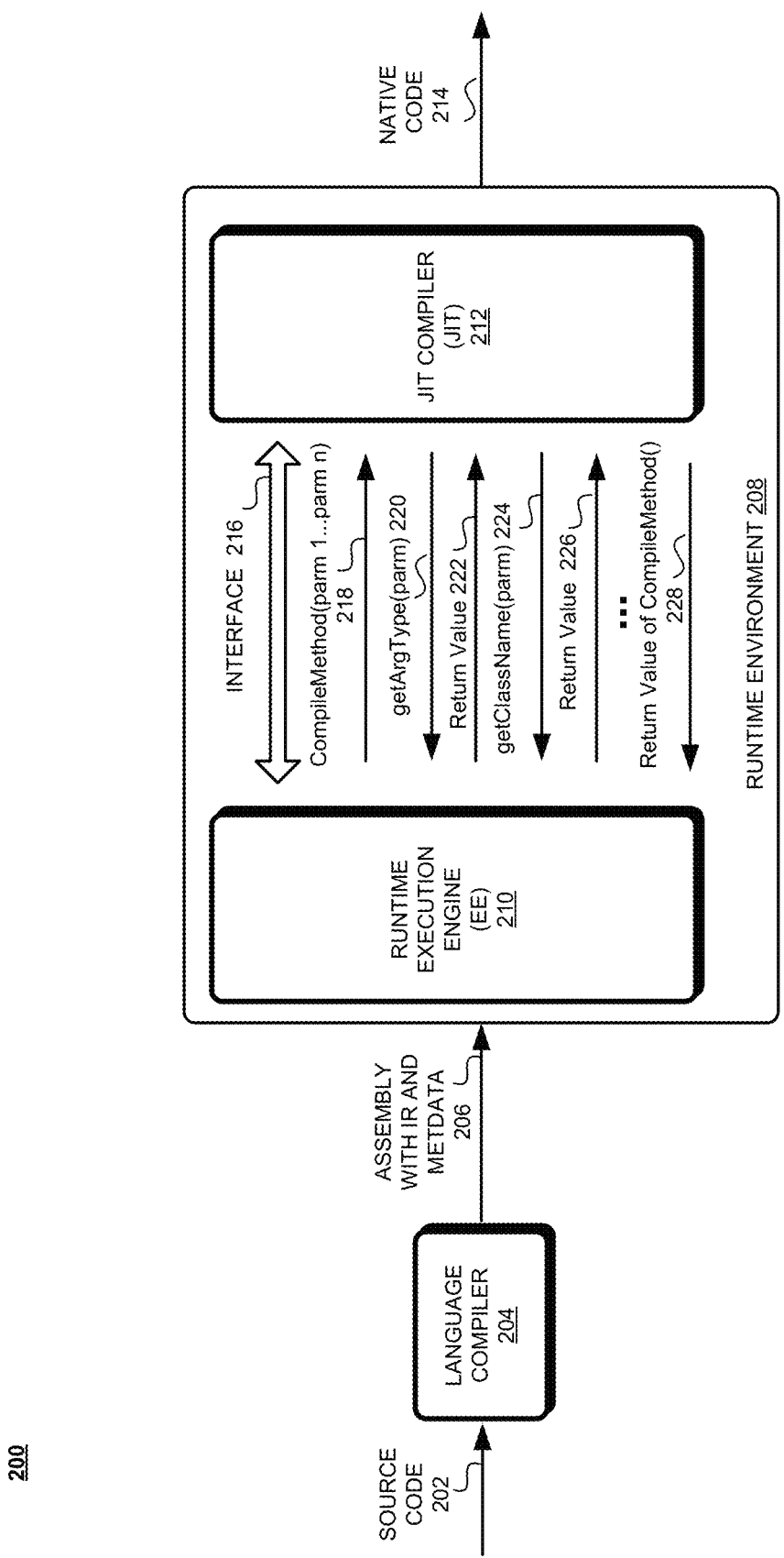
FIG. 2 is a block diagram illustrating an exemplary configuration of the components and process used in the generation of native code.

Attention now turns to FIG. 2 for a description of the interface between a runtime execution engine and a JIT compiler in the runtime execution environment. Although this description utilizes terminology specific to the .NET framework written in the C++ programming language, it should be noted that the subject matter disclosed herein is not limited to the .NET framework or the C++ programming language.

In one aspect of the subject matter disclosed herein, an exemplary configuration 200 is shown where source code 202 of a program written in a particular programming language is compiled into an assembly 206 by a language compiler 204. The assembly 206 includes IR and metadata. A runtime environment 208 (i.e., back end compiler, language virtual machine) uses the assembly 206 to generate native code 214. In an aspect of the subject matter of the invention, the runtime environment 208 includes a runtime execution engine 210 and a JIT compiler 212.

The assembly 206 includes the code for all the methods and metadata. The metadata is organized as streams of unstructured binary data that includes information on all the types, methods, fields, properties and events in the assembly. The metadata also includes all the namespace, type and member names, all strings used in the methods, method signatures, generic instantiations and globally unique identifiers (GUIDs).

The runtime execution engine 210 loads in the content of the assembly 206 and executes it. The runtime execution engine 210 recognizes that not all of the IR may be executed and as such, does not compile all the IR into native code 214. Instead, the runtime execution engine 210 converts an assembly's IR to native code 214 when an individual method defined in the assembly 206 is called and stores the resulting native code in memory. A loader (not shown) creates and attaches a stub (not shown) to each method in a type when the type is loaded and initialized. When the method is called for the first time, the stub passes control to the JIT compiler 212 to convert the IR for that method into native code 214 and changes the stub to point directly to the generated native code so that subsequent calls to the compiled method pass to the native code 214.

When the JIT compiler 212 compiles a method, the JIT compiler 212 interfaces with the runtime execution engine 210 to obtain information controlled by the runtime execution engine 210, such as the metadata in the assembly and other information stored internally in runtime data structures. There is an exchange between the JIT compiler 212 and the runtime execution engine 210 for the JIT compiler 212 to obtain this input data. This exchange is communicated through a series of API calls and responses or return values and is referred to as interface 216. In one aspect of the subject matter of the invention, this interface is the EE/JIT interface of the .NET framework.

The runtime execution engine 210 initiates an exchange with the JIT compiler 212 when a method that is called needs to be compiled. The runtime execution engine 210 invokes an API call to the JIT compiler 212, such as CompileMethod( ) 218, with one or more parameters (parm 1 . . . parm n), such as an ICorJitInfo object. The ICorJitInfo object contains a pointer to the method body and method signature, pointers for the JIT compiler 212 to store a return value, the size of the compiled code, as well as other data. The JIT compiler 212 not only compiles the method that is referenced in the ICorJitInfo object but also all other methods called within this method.

During the compilation, the JIT compiler 212 performs various functions such as type checking, code optimization, and the like, which requires information known by the runtime execution engine 210. For this reason, the JIT compiler 212 makes several requests for this information through API calls to the runtime execution engine 210 and the runtime execution engine 210 replies with a response through return values. For example, the API call getArgType (parm) 220 requests the type of a particular data element represented by the parameter, parm, which is returned by the runtime execution engine 210 as return value 222. The API call getClassName(parm) 224 requests the name of a particular class represented by the parameter, parm, which is returned by the runtime execution engine 210 in return value 226. These API calls are made to the runtime execution engine 210 since the runtime execution engine 210 has a global perspective of the program and access to the metadata and other internal data generated during execution of the program.

During this exchange, the JIT compiler 212 requests that the runtime execution engine 210 allocate memory for the method's native code and for other tables that contain data pertaining to garbage collection, debugging, and exception handling. When the JIT compiler 212 is finished compiling the method, a pointer to the entry point of the method's native code is returned as a return value as well as the size of the method's native code in the return value to the CompileMethod( ) call 228. The runtime execution engine 210 repeats this process for each method that is called that has not yet been compiled.

Figure 3A:
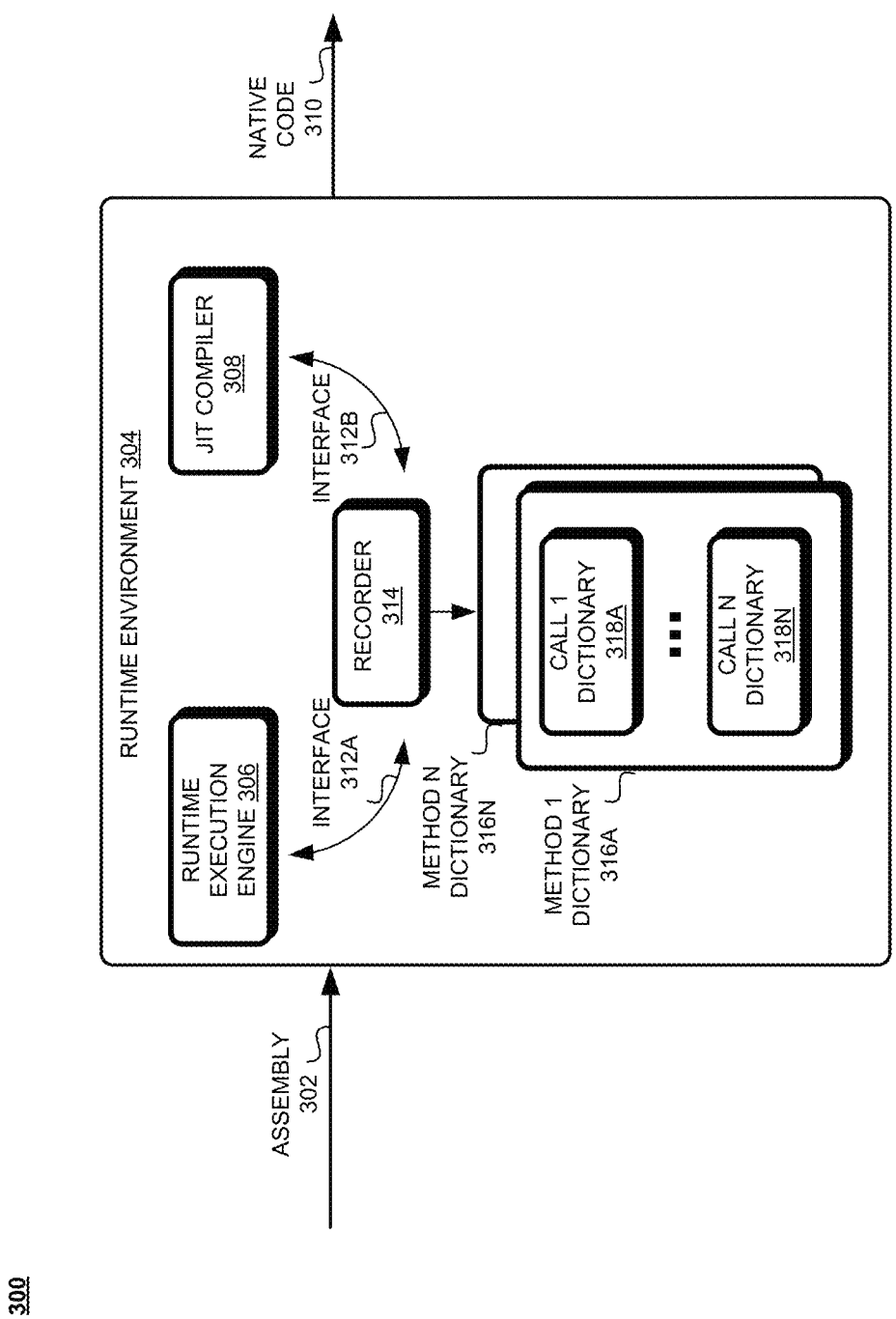
FIG. 3A is a block diagram illustrating an exemplary configuration of the components and process used to record the input data.

Attention now turns to FIG. 3A which describes an exemplary technique 300 for intercepting the exchange of communications between a JIT compiler and a runtime execution engine in order to log the input data. As shown in FIG. 3A, the runtime execution engine 306 in the runtime environment 304 receives an assembly file 302 containing IR and its associated metadata. In one aspect of the invention, the assembly file 302 is a .NET assembly where the IR is in common intermediate language ("CIL") format and the metadata contains numerous streams of data (i.e., unstructured binary data) describing the program that includes one or more of the following: all information on the types, methods, fields, properties and events in the assembly; namespace, type and member names; strings; globally unique identifiers; all method signatures, and generic instantiations.

The runtime environment 304 includes a runtime execution engine 306, a JIT compiler 308, a recorder 314, method dictionaries, (method 1 dictionary 316a, method n dictionary 316n) with each method dictionary including one or more call dictionaries 318a, 318n. The runtime environment 304 generates native code for each method of the assembly 302. The recorder 314 is part of the debugging tool.

The recorder 314 intercepts the API calls and responses in the interface 312a, 312b so that the runtime execution engine 306 and the JIT compiler 308 are unaware of this interception. In one aspect of the subject matter disclosed herein, the recorder 314 applies a detour that directs all API calls made by the JIT compiler 308 to the recorder 314 and the recorder 314 extracts the requested input data from the API call and passes the API call onto the runtime execution engine 306. Likewise, a response to the JIT compiler 308 from the runtime execution engine 306 passes to the recorder 314 which logs the requested input data from the response and passes the response onto the JIT compiler 308.

The input data requested by the JIT compiler 308 is for various types of information, such as, without limitation, one or more of the following: (1) all information on the types, methods, fields, properties and events in the program; namespace, type and member names; strings; globally unique identifiers; all method signatures, and generic instantiation; (2) information regarding methods called inside the method being compiled, including the signature of these methods, the attributes of these methods, specific inlining behaviors in these methods; (3) information pertaining to exception handling constructs and implementation details; (4) security state information; (5) mappings of types to potential primitive types; (6) addresses of intrinsic functions; (7) debugging information—data to map the IR code back to its corresponding source code; (8) symbol table data; (9) profile data; and (10) memory addresses allocated for the native code, debug data, exception handling data, and garbage collection data.

A detour is a technique that enables interception of a source function call so that a detour function is executed in place of the source function. In the present case, the detour function is the recorder 314. In an aspect of the subject matter of the invention, the detour is facilitated by a technique referred to as API hooking. In API hooking, a detour API is provided that enables the recorder 314 to change the address of an API call and response with the address of the recorder 314. In this manner, the recorder is able to log the API calls and their responses in order to use them in the test phase.

The recorder 314 logs the calls and the responses in multiple dictionaries. It should be noted that the term "dictionary" can also be referred to as a table, a map, a symbol table, data store, and/or an associative array. A dictionary is a data structure that is accessible via key value pairs, that is a key is used to obtain a value that corresponds to the key.

Each method has a dictionary (i.e., method dictionary) 316a, 316n which contains dictionaries for each call that is made (i.e., call dictionary) 318a, 318n. The parameter of each API call is used as the key into a respective call dictionary 318a, 318n and the entry corresponding to the key or value is the response that was given to the API call. These dictionaries are then utilized in the test phase to provide the same input data to the API calls that were made in the recording phase. In this manner, the compilation using the JIT compiler under test utilizes the same input data from the compilation that is made with the reliable JIT compiler.

Figure 3B:
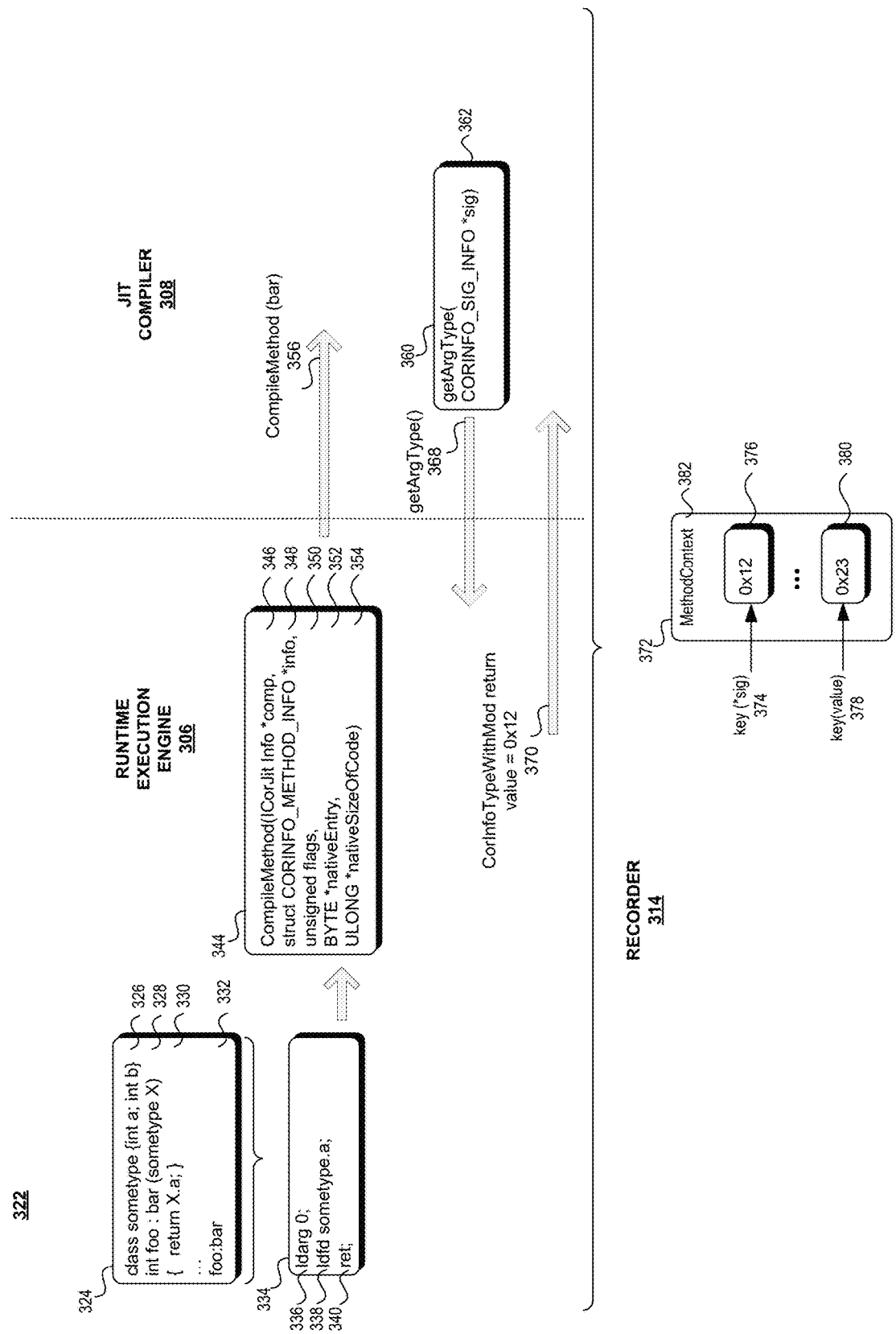
FIG. 3B is a block diagram illustrating an example of recording the input data into dictionaries.

FIG. 3B depicts an example 322 illustrating the recording phase. There is shown source code 324 having four lines of code. Line 326 defines sometype as a class having two integer parameters a, b. Line 328 defines the method bar having a parameter X of type sometype that returns an integer value into variable foo. Line 330 of method bar returns the variable X.a. Line 332 invokes a call to the method bar with the return value stored in foo. The IR code for this method is shown in block 334 which contains three lines of code. Line 336 loads the value of arg0. Line 338 treats the value of having the type sometype and grabs the field value for a. Line 340 returns execution of the method back to the point in the program from which it was called.

When the runtime execution engine 306 executes the call to bar, it invokes the CompileMethod API call 344 to the JIT compiler 308 for the JIT compiler 308 to compile the method bar 356. The CompileMethod API call 344 includes a pointer (*comp) to the ICorJitInfo object 346, a pointer (*info) to the CORINFO_METHOD_INFO structure 348, unsigned flags 350, a pointer (*nativeEntry) to the memory location of the native code 352, and a pointer (*nativeSizeOfCode) to the size of the native code 354. The CORINFO_METHOD_INFO structure contains a method handle that can directly access the IR of the method 334 as well as other data.

During the compilation of the method bar, the JIT compiler 308 encounters the ldarg 0 instruction. The JIT compiler 308 issues an API call 360, 368 to the runtime execution engine 306 for the class objects and the types of the arguments used in the invocation of the method bar. The API call may be a getArgType( ) API call 360 that includes a pointer (*sig) to the CORINFO_SIG_INFO structure that describes the method signature of bar 362 as well as other parameters. The runtime execution engine 306 responds with a CorInfoTypeWithMod return value of 0x12 which represents the type class 370.

During this exchange, the recorder 314 records the CompileMethod API call for the compilation of the method bar into a corresponding method dictionary 372. The method dictionary 372 may utilize the MethodContext 382 associated with the method as a key into the method dictionary. The MethodContext is used by the runtime execution engine 306 to track the calls made to the JIT compiler 308.

For each subsequent call during the compilation of the method bar, a separate call dictionary is generated where the key is associated with one or more of the first arguments or parameters of the API call and the value corresponds to the response. For example, for the getArgType API call, the key could be a value associated with first parameter, such as the method signature, (i.e., the pointer *sig 374) and the value at this location is the value 0x12 which represents the type class 376. When the getArgType API call is invoked by a different JIT compiler in the test phase, the debugging tool uses the value associated with the first parameter, such as the method signature (i.e., pointer *sig) used in the API call as the key to lookup the response in the method dictionary 372 which is 0x12. Likewise, for a subsequent API call made by the JIT compiler to the runtime execution environment, the key to lookup the previously recorded response may be one or more of the arguments or parameters used in the recorded API call. As shown in FIG. 3B, the key 378, is used to obtain the response 380 which contains the value 0x23, includes a value that is constructed from one or more of the arguments used in the recorded API call. It should be noted that the subject matter of the technology described herein is not constrained to any particular configuration of keys and values and that other techniques may be used, such as a hash function of the API call, a hash function of one or more of the parameters of the API call, and the like.

Attention now turns to a description of the operations for the aspects of the subject matter described with reference to various exemplary methods. It may be appreciated that the representative methods do not necessarily have to be executed in the order presented, or in any particular order, unless otherwise indicated. The exemplary methods may be representative of some or all of the operations executed by one or more aspects described herein and that the method can include more or less operations than that which is described. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints.

Figure 4A:
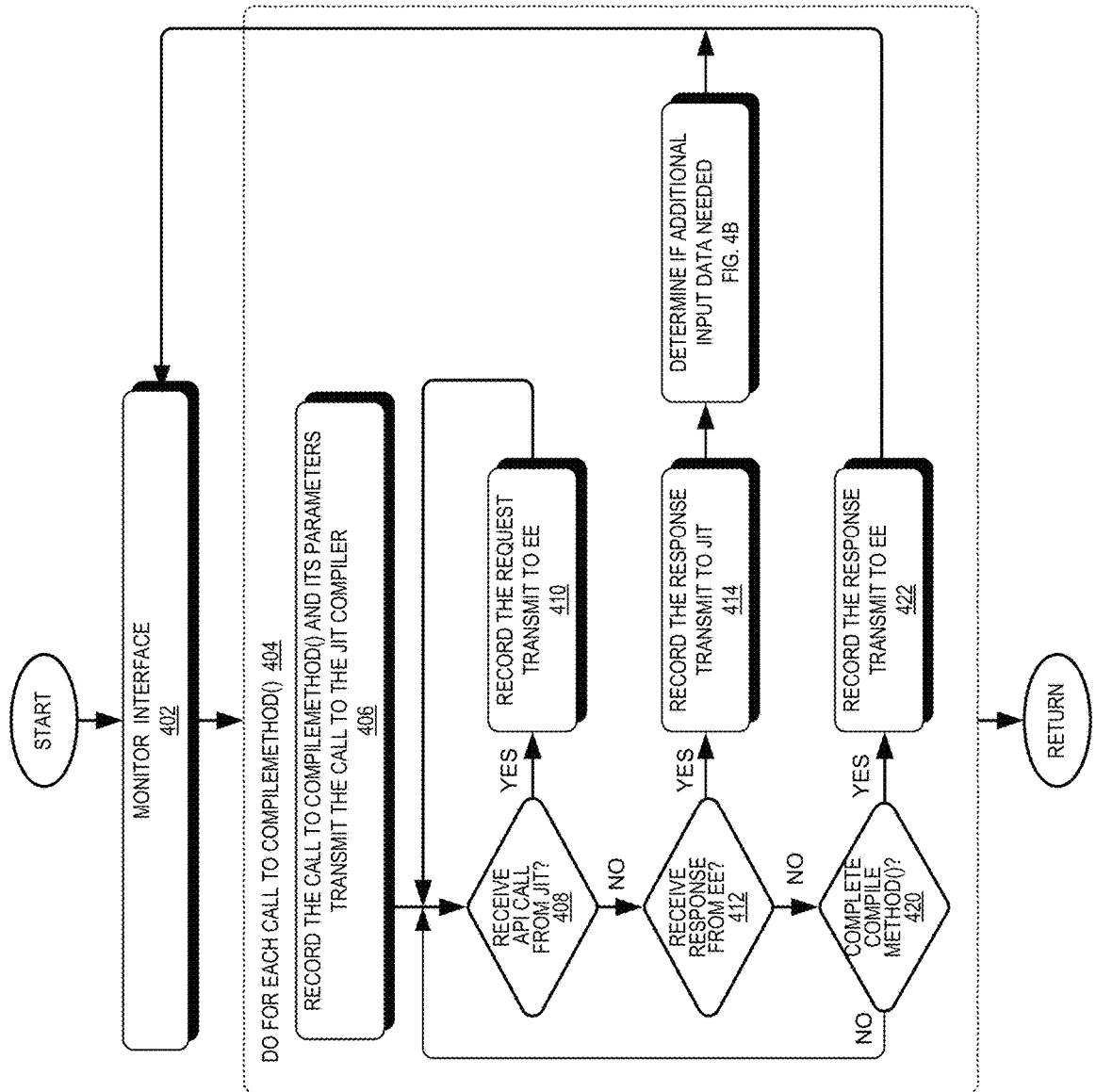
FIGS. 4A-4B are flow diagrams of an exemplary method for recording the input data.
Figure 4B:
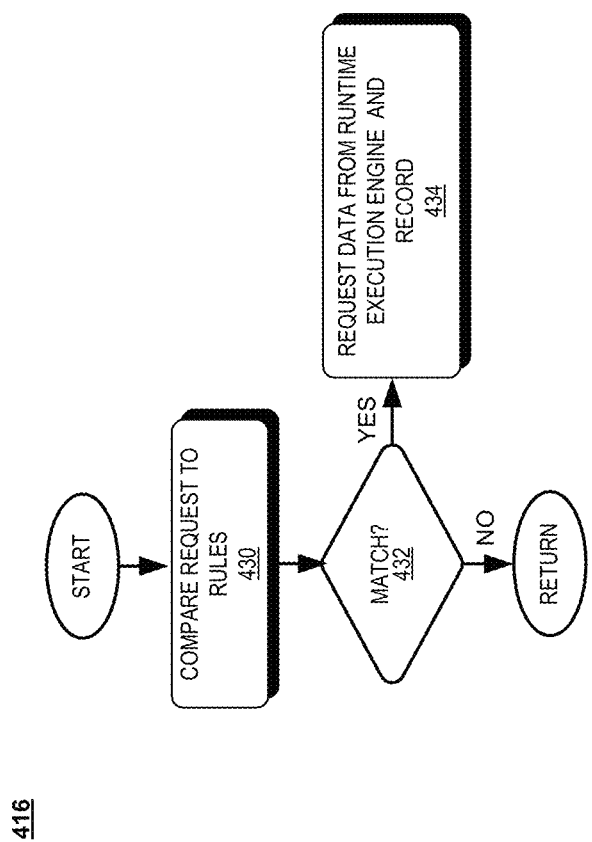

FIGS. 4A-4B illustrate a flow diagram of an exemplary method 400 for recording the input data exchanged in the interface between the runtime execution engine and the JIT compiler. Referring to FIGS. 3A-3B and 4A-4B, the recorder 314 intercepts the communications between the runtime execution engine 306 and the JIT compiler 308. The recorder 314 monitors the communications (block 402) for the CompileMethod( ) API call (block 404). This API call is logged into a method dictionary 316a, 'n for the method associated with this particular CompileMethod( ) API call (block 406). Each subsequent API call and response that is made, until the CompileMethod( ) API call is completed, the recorder 314 logs into a separate call dictionary 318a, 318n associated with the method.

When the recorder 314 intercepts an API call from the JIT compiler 308 (block 408—yes), the recorder 314 logs the API call into a respective call dictionary 318a, 318n, using the memory address associated with one or more parameters of the API call as the key, and forwards the API call to the runtime execution engine 306 (block 410). When the recorder 314 intercepts the response to the API call from the runtime execution engine 306 (block 412—yes), the response is recorded in the respective call dictionary 318a, 318n as the value corresponding to the key and forwarded to the JIT compiler 308 (block 414).

In some cases, the recorder 314 will request additional information from the runtime execution engine in response to receiving a particular request even though the JIT compiler did not request it. The recorder 314 requests this additional information in anticipation that it will be needed when the method is compiled with a different JIT compiler. JIT compilers differ in the actions that they perform during the compilation of a method and as such, these compilers execute with different types and amount of input data. In one aspect of the invention, during the recording, the recorder 314 may request this additional information which is stored in the dictionaries.

For example, one JIT compiler, JIT A, may have a shallow internal type system while another JIT compiler, JIT B, may have a more robust type system. JIT A may be the reliable JIT compiler from which the input data is recorded and JIT B may be the JIT compiler under test. When JIT A is compiling a method that references the fields of a parameter, it may only require the offsets of the specific fields that it needs. When JIT B compiles the same method, it may require all of the field offsets for each type. However, the dictionaries will not have this input data, that is all the field offsets for each type in the method, since it was not recorded when the method was compiled with JIT A. In this situation, the recorder is configured to record additional information in order to capture all the field offsets for each type in anticipation of having this input data for JIT B's compilation.

Turning to FIG. 4B, the recorder matches an API call or request with a set of rules or heuristics which will indicate whether or not additional input data is needed (block 430). If the request matches a rule (block 432—yes), then the recorder requests the additional information from the runtime execution engine and stores this information in the dictionaries (block 434). Otherwise (block 432—no), the recorder proceeds to monitor the interface.

Exemplary rules or heuristics may include one or more of the following:

(1) when the request is for a method signature, obtain the type of the return value associated with the method signature;

(2) when the request is for a getinline of a method, obtain the class handle of the method;

(3) when the request is for a method class, obtain the class handle of the method;

(4) when the request is to resolve a token, obtain the type attributes, the child type and the corresponding fields and field offsets;

(5) when the request is for a type referred to as a CorInfoType, obtain the corresponding primitive value class type;

(6) when the request is for a fields type, obtain the class handle for that type and the attributes for the corresponding field;

(7) when the request is for an args class, obtain the class handle for the class; and (8) when the request pertains to a CallInfo class, obtain the corresponding method name, attributes and handles.

The recorder 314 records this additional input data into a respective dictionary. In this situation, the recorder 314 uses the key associated with the original API call to insert the additional input data into a respective method dictionary and the value used is associated with at least one or more parameters used in the API call from the recorder to the runtime execution engine to obtain the additional input data.

Turning back to FIG. 4A, when the recorder 314 intercepts the response to the CompileMethod( ) API call (block 420—yes), the recorder 314 records the response in the corresponding call dictionary 318a, 318n (block 422) and the recorder 314 returns to monitor the interface 312a, 312b (block 402). Otherwise (block 420—no), the recorder 314 awaits the next communication between the runtime execution engine 306 and the JIT compiler 308.

Figure 5:
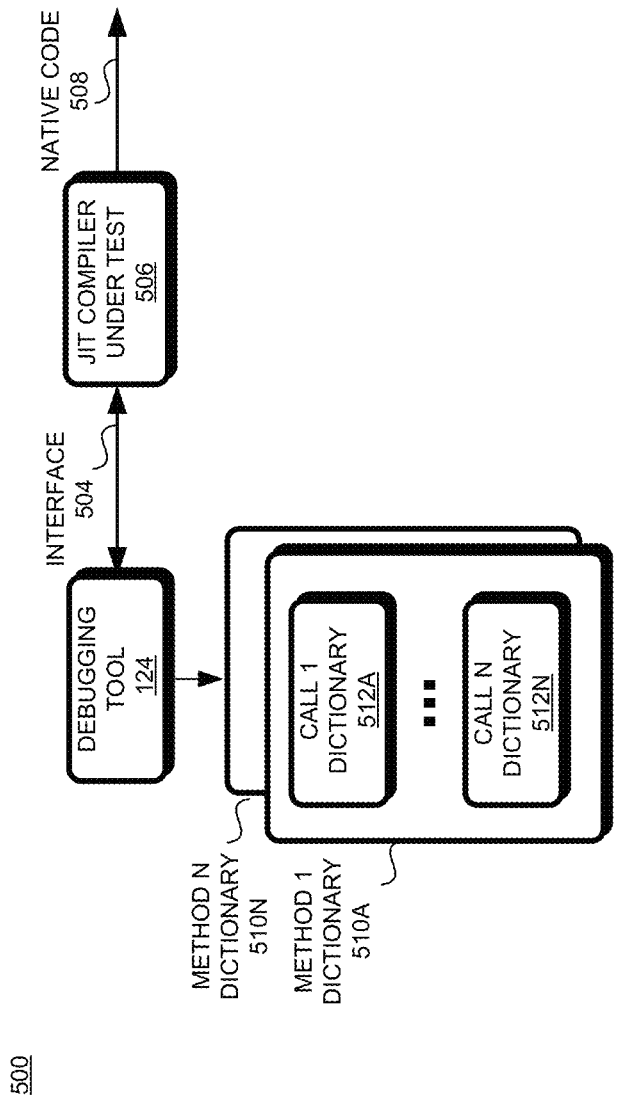
FIG. 5 is a block diagram illustrating an exemplary configuration of the components and process used to compile one or more methods using the recorded input data.

Attention now turns to a discussion of an exemplary method for JIT compiling a program with a different JIT compiler using the recorded runtime information. Referring to FIG. 5 there is shown a system 500 including a debugging tool 124 coupled to a JIT compiler under test 506. The debugging tool 124 takes the place of the runtime execution environment and communicates with the JIT compiler under test 506 as if the debugging tool 124 were the runtime execution engine. The debugging tool 124 uses the method dictionaries 510 a,n and the call dictionaries 512a,n to obtain the input data or responses to the JIT compiler under test 506.

The debugging tool 124 is not constrained to a particular order when recompiling the methods of a program. The debugging tool 124 is able to select any particular method to recompile without there being any dependencies on other methods in the program being compiled or executed before or after the targeted method. The use of the dictionaries provides the debugging tool 124 with this capability since the recorded input data is stored in a data structure having a key, value pair which enables access to the input data of a method independent of any order. This differs from other techniques that utilize stack-based data structures to store the input data which requires access to recorded data to be based on the order in which the data was stored, such as the order in which a method was compiled during the recording.

Figure 6:
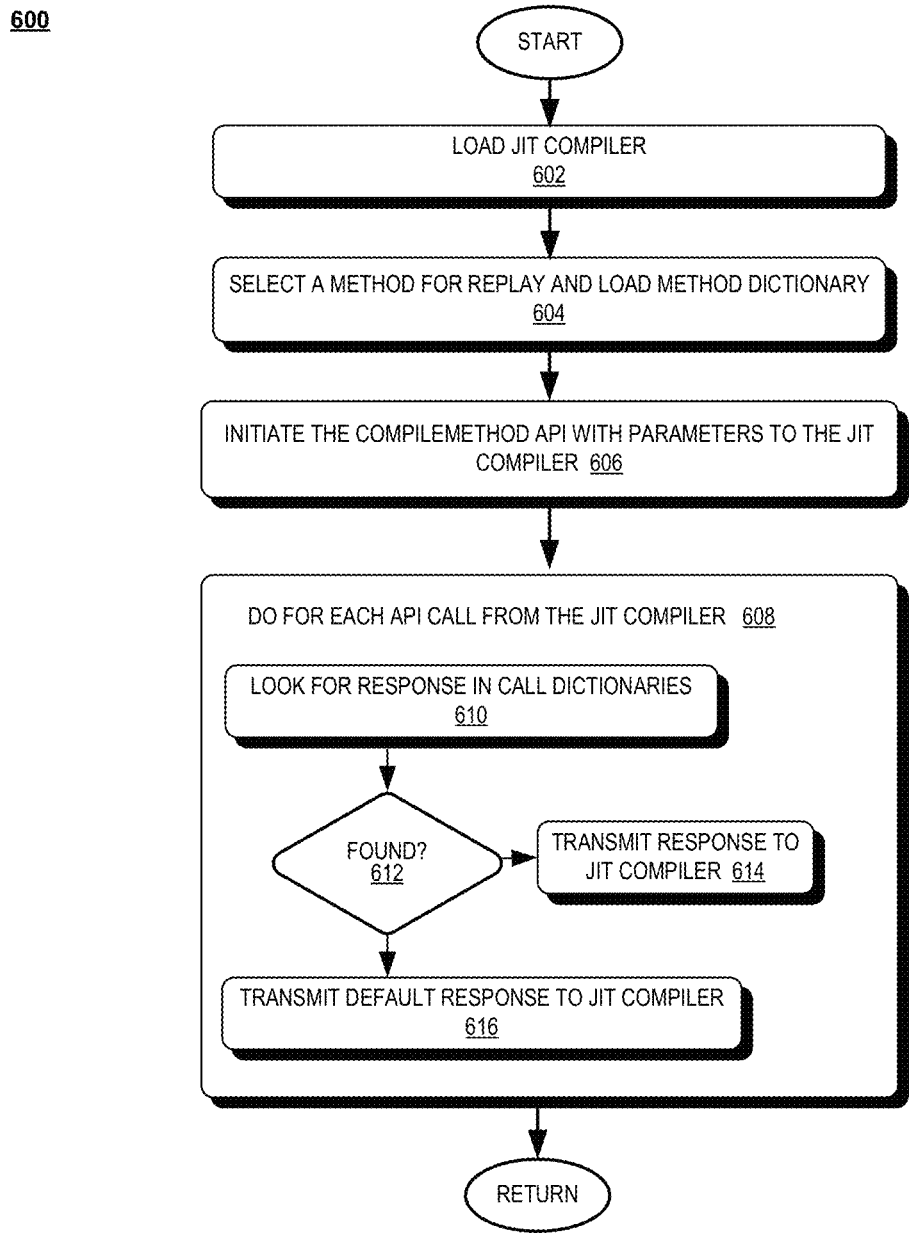
FIG. 6 is a flow diagram of an exemplary method used to compile a method using a JIT compiler under test.

Referring to FIGS. 5 and 6, the debugging tool 124 loads the particular JIT compiler to test 506 (block 602). A method is then selected to compile with the JIT compiler under test 506 and its corresponding method dictionary is loaded 510 a,n (block 604). It should be noted that the debugging tool is not constrained to compiling the methods in any particular order such as the same order that the methods were recorded. The method and call dictionaries are constructed in a manner that allows the debugging tool to select any method to compile independently. Likewise, the debugging tool can respond to the API calls made from the JIT compiler under test regardless of the order in which these calls are received by the debugging tool.

The debugging tool 124 then generates a CompileMethod API call with the same parameters as in the recording. This same API call is recorded in a method dictionary 510a,n which is accessed to obtain the same method signature which is sent to the JIT compiler under test 506 (block 606). The debugging tool 124 then waits to receive API calls from the JIT compiler under test 506. For each API call (block 608), the debugging tool 124 searches for the response in the associated call dictionary 512a,n (block 610). If the response is found (block 612—yes), the response is transmitted as a return value to the API call to the JIT compiler under test 506 (block 614). If not (block 612—no), a default response is created and sent back to the JIT compiler under test 506 as the return value to the API call (block 616). These steps are repeated until the JIT compiler under test 506 completes compilation of the CompileMethod API call.

Figure 7:
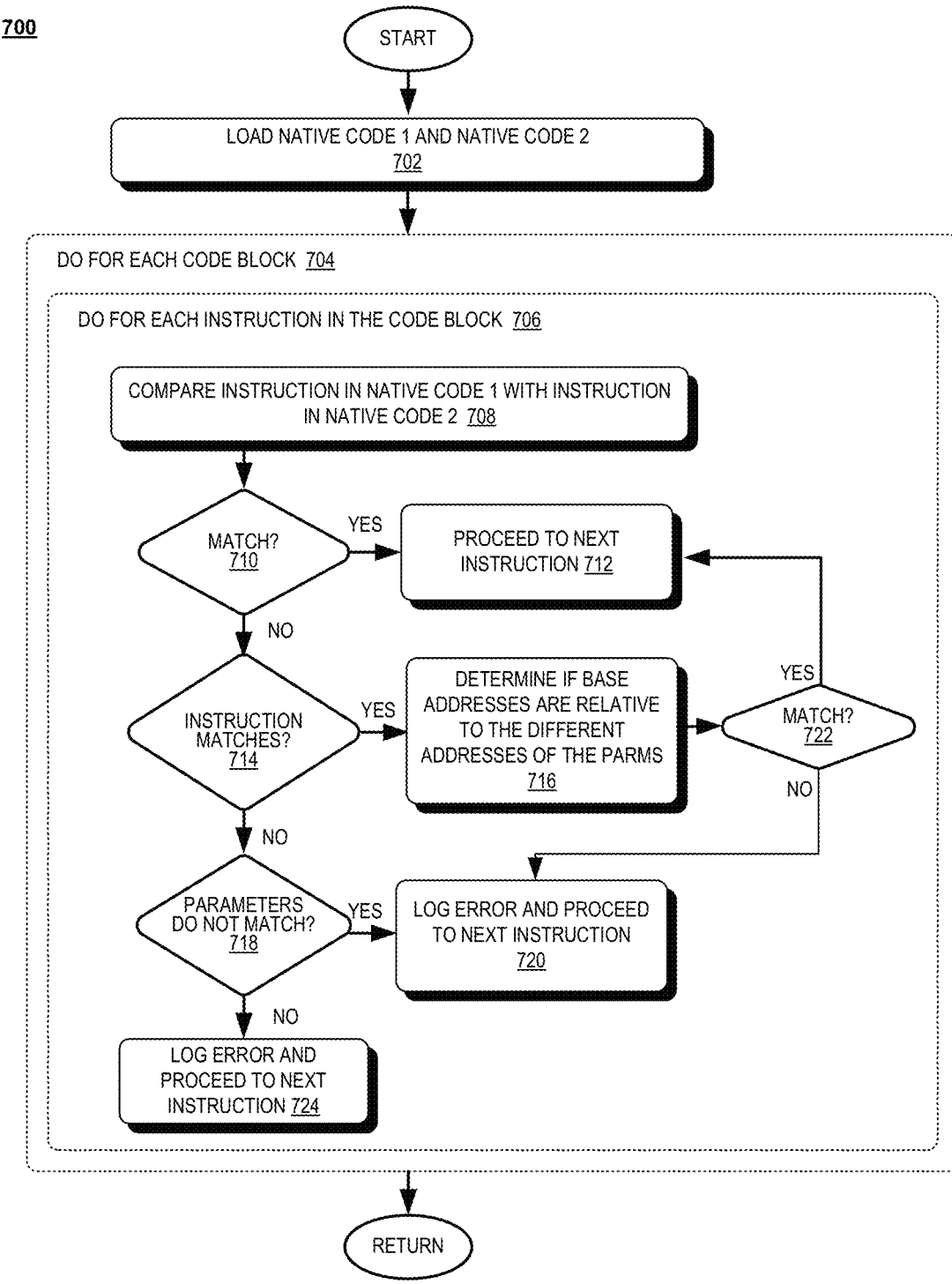
FIG. 7 is a flow diagram of an exemplary method used to compare the native codes of a same method produced from compilations using different compilers.

Attention now turns to a discussion of the analysis of different native codes compiled from different JIT compilers using the same input data. Referring to FIGS. 1 and 7, the debugging tool 124 loads two differently compiled native code files, native code 1 and native code 2 (block 702). The debugging tool 124 then compares each code block in the first native code file, native code 1, with a corresponding code block in the second native code file, native code 2 (blocks 704, 706). A code block is the set of native code instructions that correspond to a particular method in the program. The term method refers to a function in an object-oriented programming language that is associated with an object class, where the object class includes behavior (i.e., code that implements the function) and data. Each instruction in the code block of the first native code file is compared with the corresponding instruction in the code block of the second native code file. The location of an instruction in the code block is used as a determination of its relation or correspondence to a corresponding instruction in the other code block.

The debugging tool 124 then compares each related or corresponding instruction (block 708) to determine if the instruction and its parameters match (block 710). If the entire instruction matches (block 710—yes), then the debugging tool 124 proceeds to the next instruction (block 712). If the instruction does not match (block 714—no), but only the instruction itself matches and not the parameters (block 714—yes), then the difference between the addresses of the two parameters is determined. If the difference between the base address of the two code blocks differs by this same amount (block 716), then the instructions will be considered the same (block 722—yes).

For example, consider a first code block that includes the following instructions:

mov EAX, 1x1234
mov ECX, 0x1235 and a second code block includes the following instructions:

mov EAX, 0x4234
mov EAX, 0x4235.

The difference between the base address of the two code blocks is 0x3000 and as such, the debugging tool 124 will determine these two instructions to be equivalent. If the difference between the base addresses is not the same (block 722—no), then the two instructions will be identified as different and logged as an error (block 720). If neither the instruction nor the parameters match (block 718—yes), then the two instructions are identified as different and logged as an error (block 720). Otherwise (block 718—no), log the instructions as being in error and proceed to the next instruction (block 724).

The difference in the instructions between these two native code files is then used to debug the JIT compiler under test. These differences are used to determine how the JIT compiler is generating its code and is used to point to the source of the problem in the JIT compiler under test.

Alternatively, some JIT compilers (e.g., Java JIT compilers) use symbols or tokens to reference a memory address. In this case, the debugging tool determines the addresses represented by the symbol or token in order to perform the comparison.

In accordance with aspects of the subject matter described herein, a computer system can include one or more processors, a memory connected to one or more processors, and at least one module that when loaded into the memory causes the one or more processors to perform a first JIT compilation on a method of a program using a first JIT compiler and a second JIT compilation on the same method using a second JIT compiler. The first JIT compilation generates a first native code using input data to perform the JIT compilation of the method and the second JIT compilation generates a second native code using the same input data as in the first JIT compilation of the method. The instructions in the native code for the method generated from the first JIT compilation is compared with the instructions in the native code generated from the second JIT compilation. The differences in these instructions are then output.

The input data that a JIT compiler may need from a runtime environment can include one or more of type data of an element used in the method, a method signature of another method in the method, debugging information pertaining to the method, memory addresses pertaining to the method, profile data pertaining to the method, and symbol table data pertaining to the method. The input data is obtained from intercepting the API calls initiated from a JIT compiler to the runtime environment requesting the input data. The requested input data is obtained from the runtime environment and stored in a dictionary using a key constructed from a parameter in the API call. In this manner, when the same API call is later called by a second JIT compiler, the input data can be retrieved from the dictionary using that same parameter in the same API call made by the second JIT compiler.

Additional input data may be retrieved from the runtime environment that is related to the input data requested from the first JIT compiler even though the additional input data was not requested by the first JIT compiler. This additional input data is retrieved when the data in the first API call matches a rule indicating that this additional input data is to be retrieved during the recording phase.

A device can include one or more processors, a memory connected to at least one processor, a runtime environment, a first JIT compiler, a second JIT compiler, a recorder, and a debugging tool. The first JIT compiler performs a first compilation of the method using input data provided by the runtime environment. A recorder records the input data that is used in the first JIT compilation. The first JIT compiler generates a first native code for the method. A second JIT compiler performs a second compilation of the method using the same input data. The first and second JIT compilers are different. The second compilation generates a second native code of the method. A debugging tool receives requests for the input data from the second JIT compiler in the second compilation and obtains the requested input data from the first data store to return to the second JIT compiler.

The recorder intercepts the API calls that are directed to the runtime environment in order to store the input data for use in the second compilation. The input data is stored in the first data store in a location based on one or more parameters in the intercepted API call. The debugging tool intercepts the API calls in the second compilation from the second JIT compiler and obtains the requested input data from the data store. In some situations, the debugging tool may request additional input data from the runtime environment during the first compilation even though it is not requested from the first JIT compiler. The debugging tool compares the first native code and the second native code to determine differences between these codes.

The input data that is requested by a JIT compiler during compilation may include one or more of type data of an element used in the method, a method signature of another method in the method, debugging information pertaining to the method, memory addresses pertaining to the method, profile data pertaining to the method, and symbol table data pertaining to the method.

A method of using a system and device, such as the system and device described above, can include operations such as intercepting a first API call made by a first JIT compiler during a JIT compilation of a method of a program where the first API call requests input data from a runtime environment executing the program, obtaining the input data from the runtime environment and transmitting it to the first JIT compiler, and issuing a second API call to the runtime environment for additional input data, based on the first API call meeting a predefined condition, without initiation from the first JIT compiler, and storing the input data and the additional input data in a data store that is accessible through a key associated with one or more of the parameters of the first API call. A second API call is made using a second JIT compiler which requests the additional input data and which is retrieved from the data store. In the event the requested input data cannot be obtained, a default response is generated.

The input data that a JIT compiler may need from a runtime environment can include one or more of type data of an element used in the method, a method signature of another method in the method, debugging information pertaining to the method, memory addresses pertaining to the method, profile data pertaining to the method, and symbol table data pertaining to the method. The predefined conditions may include one or more of (1) when the first API call is for a method signature, obtain a type of a return value associated with the method signature; (2) when the first API call is for a method class, obtain a class handle of the method; and (3) when the first API call is to resolve a token, obtain type attributes, a child type and corresponding fields and field offsets of the token. The input data may be accessed in the data store through a key associated with at least one parameter from the first API call.

The method generates a first native code of the method using the first JIT compiler and a second native code of the method using the same input data as the first JIT compiler and compares the first and second native codes to determine differences that are indicative of a problem with the second JIT compiler.

Examples of Suitable Computing Environments

Figure 8:
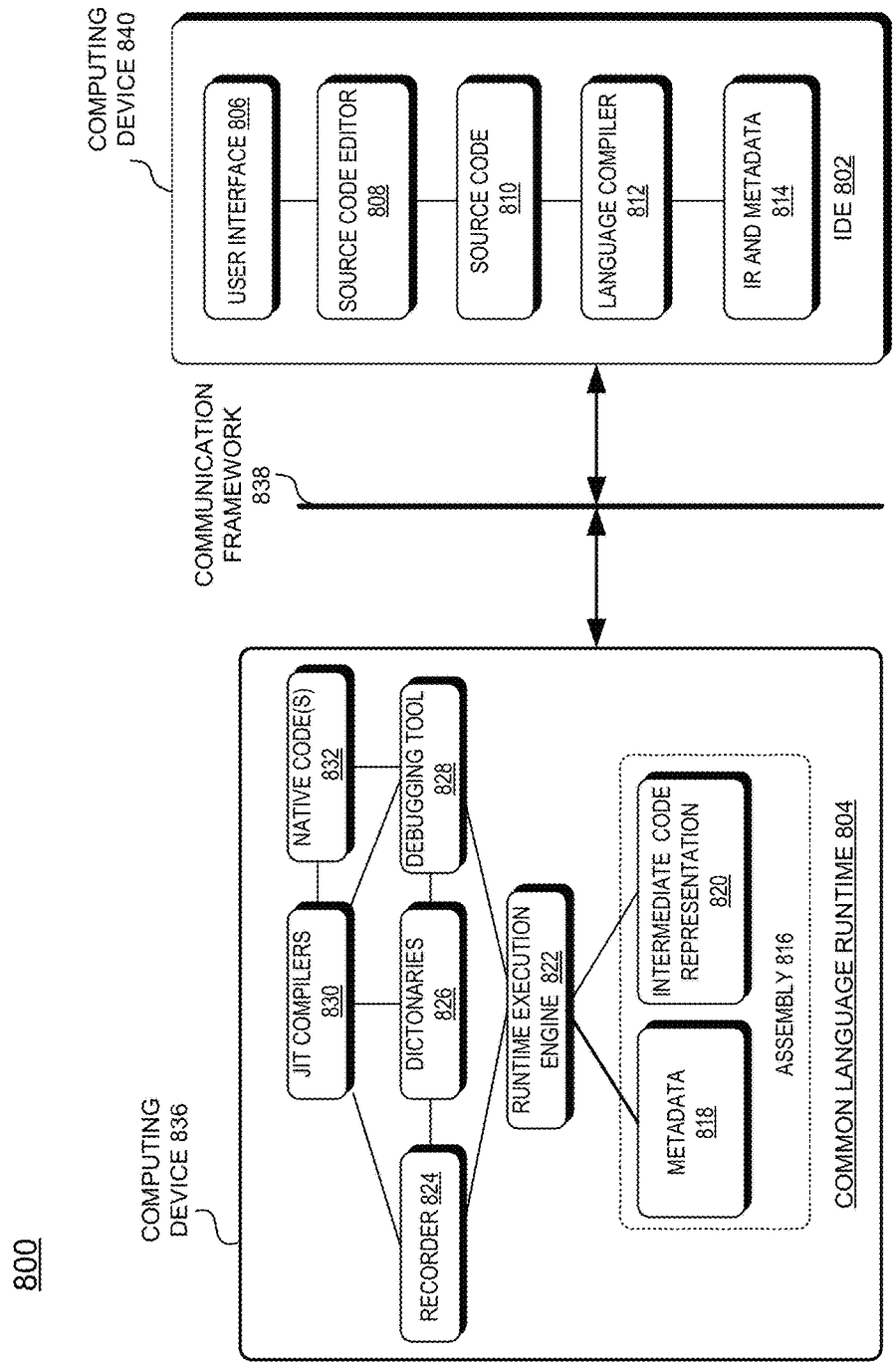
FIG. 8 is a block diagram illustrating a first exemplary computing or operating environment.

Attention now turns to a discussion of exemplary operating environments. FIG. 8 depicts a first exemplary operating environment 800 that includes an integrated development environment ("IDE") 802 and a common language runtime ("CLR") 804. The IDE 802 (e.g., Visual Studio, NetBeans, Eclipse, JetBrains, NetCode, etc.) may allow a user (e.g., developer, programmer, designer, coder, etc.) to design, code, compile, test, run, edit, debug or build a program, set of programs, web sites, web applications, packages, and web services in a computing device. Software programs include source code 810 created in one or more source code languages (e.g., Visual Basic, Visual J #, C++. C #, J #, Java Script, APL, COBOL, Pascal, Eiffel, Haskell, ML, Oberon, Perl, Python, Scheme, Smalltalk and the like).

The IDE 802 may provide a native code development environment or may provide a managed code development that runs on a language virtual machine or may provide a combination thereof. The IDE 802 may provide a managed code development environment using the .NET framework that may include a user interface 806, a source code editor 808, source code 810, a language compiler 812, and the IR and metadata 814 A user can create and/or edit the source code according to known software programming techniques and the specific logical and syntactical rules associated with a particular source language via the user interface 806 and the source code editor 808 in the IDE 802. Thereafter, the source code 810 can be compiled via a language compiler 812, whereby an IR and metadata 814 is created.

In one aspect of the invention, the IDE 802 may operate on a first computing device 840 and the CLR 804 may operate on a second computing device 836 that is distinct from the first computing device 840. In another aspect of the invention, the IDE 802 and CLR 804 may operate on the same computing device. The computing devices 836, 840 may be any type of electronic device, such as, without limitation, a mobile device, a personal digital assistant, a mobile computing device, a smart phone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof.

The first and second computing devices 836, 840 may be communicatively coupled through a communication framework 838. The communication framework 838 facilitates communications between the computing devices. The communications framework 838 may embody any well-known communication techniques, such as techniques suitable for use with packet-switched networks (e.g., public networks such as the Internet, private networks such as enterprise intranet, and so forth), circuit-switched networks (e.g., the public switched telephone network), or a combination of packet-switched networks and circuit-switched networks (with suitable gateways and translators).

The common language runtime 804 utilizes a runtime execution engine 822 that reads in assembly 816 which is composed of metadata 818 and intermediate code representation 820. The runtime execution engine 822 interacts with a recorder 824 during the recording phase and a debugging tool 828 during the test phase. The input data is recorded by the recorder 824 during the recording phase and stored in dictionaries 826 used by the debugging tool 828 in the test phase. One or more JIT compilers 830 may be used by the recorder 824 and the debugging tool 828. The debugging tool 828 compares one or more of the native codes 832 to determine problems with a JIT compiler 830.

Although the foregoing operating environment has been described with respect to the .NET framework, the technology described herein is not constrained to any particular software framework, programming language, compiler collection, operating system, operating system platform, compiler infrastructure project, and the like. The techniques described herein can be employed in the GNU compiler collection (GCC) and the Low-Level Virtual Machine (LLVM) compiler infrastructure and other compiler and operating systems frameworks that employ dynamic compilation.

Figure 9:
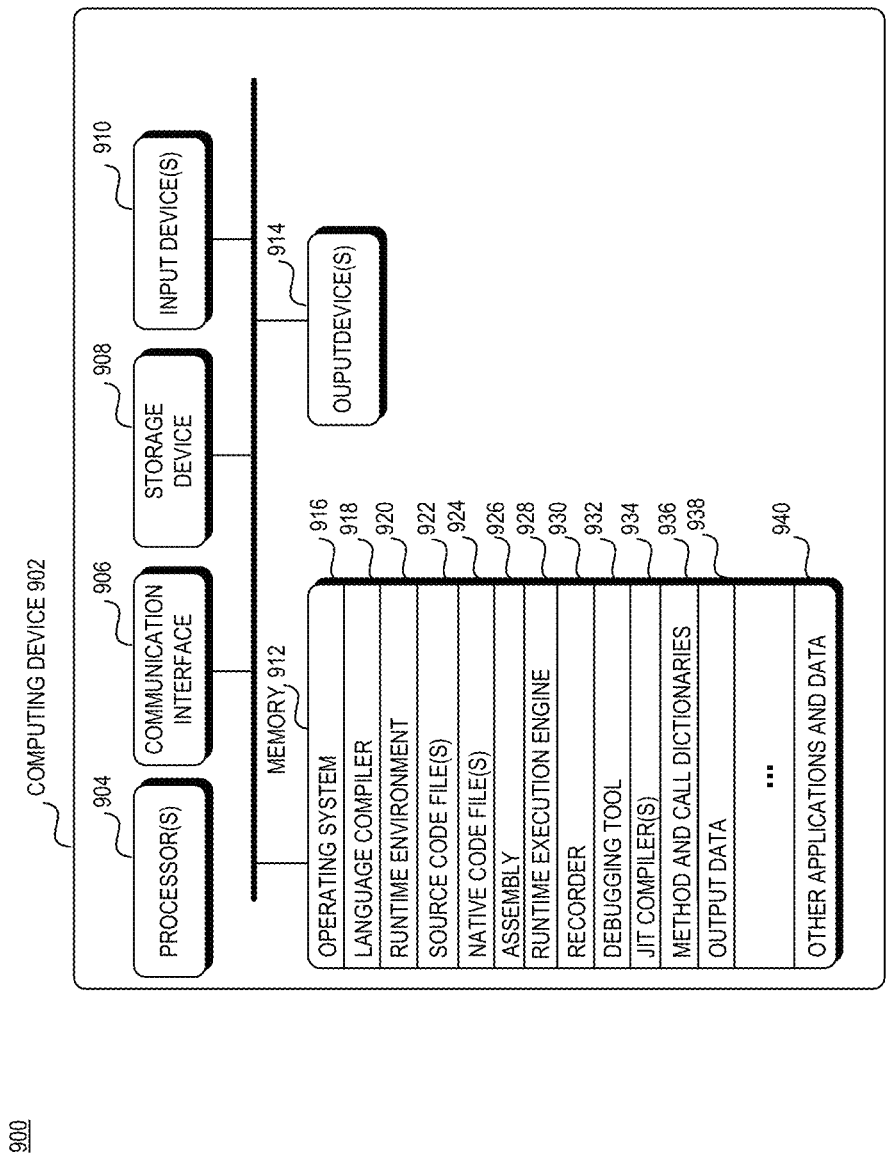
FIG. 9 is a block diagram illustrating a second exemplary computing or operating environment.

Attention now turns to FIG. 9 and a discussion of a second exemplary operating environment. It should be noted that the operating environment 900 is exemplary and is not intended to suggest any limitation as to the functionality of the embodiments. The embodiments may be applied to an operating environment 900 utilizing at least one computing device 902. The computing device 902 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 900 may be configured in a network environment, a distributed environment, a multi-processor environment, or a stand-alone computing device having access to remote or local storage devices.

The computing device 902 may include one or more processors 904, a communication interface 906, a storage device 908, one or more input devices 910, a memory 912, and output devices 914. A processor 904 may be any commercially available processor and may include dual microprocessors and multi-processor architectures. The communication interface 906 facilitates wired or wireless communications between the computing device 902 and other devices. The storage device 908 may be computer-readable medium that does not contain propagating signals, such as modulated data signals transmitted through a carrier wave. Examples of the storage device 908 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage device 908 in the computing device 902. The input devices 910 may include a keyboard, mouse, pen, voice input device, touch input device, etc., and any combination thereof. The output devices 914 may include a display, speakers, printers, etc., and any combination thereof.

The memory 912 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 912 may also include one or more external storage devices or remotely located storage devices that do not pertain to propagated signals, such as modulated data signals transmitted through a carrier wave.

The memory 912 may contain instructions, components, and data. A component is a software program that performs a specific function and is otherwise known as a module, program, application, and the like. The memory may include an operating system 916, a language compiler 918, a runtime environment 920, source code files 922, native code files 924, an assembly file 926 that includes the IR and metadata, a runtime execution engine 928, recorder 930, debugging tool 932, one or more JIT compilers 934, method and call dictionaries 936, output data 938 and other applications and data 940.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, several components have been described with respect to the .NET framework. However, the aspects of the subject matter described herein are not limited to the .NET framework and can be applied to the Java runtime environment, LLVM, and any other JIT compilation system.

The subject matter disclosed has been described with respect to testing the native code of a reliable JIT compiler and a JIT compiler under test. However, the comparison may be made for any type of JIT compiler and for any number of JIT compilers. For example, the recording phase is not constrained to recording the input of a compilation using a reliable JIT compiler rather to any type of JIT compiler regardless of whether is produces reliable native code or not. For example, the recording phase can be based on a compilation using a first JIT compiler and the testing phase can be based on a compilation using the same first JIT compiler or a second JIT compiler that differs from the first JIT compiler.

The subject matter disclosed herein is not constrained to testing and/or debugging JIT compilers. The techniques disclosed may be applied to different tools that generate any type of code, such as source code, IR, managed code, or native code, such as without limitation software development kits (SDKs), source-to-source compilers, static compilers, ahead-of-time compilers, and the like. Alternatively, the subject matter is not constrained to comparing native code and the techniques described can be used to compare IL code or a lower level representation of code that is higher than native code.

Furthermore, the subject matter disclosed can be utilized in a debugging environment where individual test programs are run through the JIT compiler under test and compared against a specified output. Additionally, a JIT compiler under test and an old "reliable" JIT compiler can be used in a production run, with the runtime execution environment essentially invoking both JITs concurrently on a production service, doing the analysis online rather than offline and flagging any differences for later follow-up and further analysis offline. This scenario can be part of a cloud service.

What is claimed:

1. A system, comprising:
   at least one processor and a memory; and
   at least one module that when executed on the at least one processor performs actions that:
   performs a first JIT compilation of a method of a program using a first JIT compiler;
   generates a first native code of the method from the first JIT compilation;
   during the first JIT compilation, records input data provided to the first JIT compiler from a runtime environment, the input data used by the first JIT compiler to generate the first native code;
   during the first JIT compilation, records additional data pertaining to the method from the runtime environment, not provided to the first JIT compiler, for use in a second JIT compilation;
   performs the second JIT compilation of the method with a second JIT compiler using the input data and the additional data;
   generates a second native code of the method from the second JIT compilation; and
   outputs whether or not the instructions in the first native code and the instructions in the second native code are equivalent.

2. The system of claim 1, wherein the input data includes one or more of:
   type data of an element used in the method;
   a method signature of another method in the method;
   debugging information pertaining to the method;
   memory addresses pertaining to the method;
   profile data pertaining to the method; or
   symbol table data pertaining to the method.

3. The system of claim 1, wherein the at least one module when executed on the at least one processor performs further actions that:
   intercepts a first API call from the first JIT compiler requesting a first input data;
   obtains the first input data from the runtime environment; and
   stores the first input data in a dictionary using a key corresponding to at least one or more parameters in the first API call.

4. The system of claim 3, wherein the at least one module when executed on the at least one processor performs further actions that:
   receives a second API call from the second JIT compiler requesting the first input data; and
   retrieves the first input data from the dictionary using at least one parameter in the second API call to access the first input data.

5. The system of claim 4, wherein the second API call is received in a sequence that differs from receipt of the first API call.

6. The system of claim 3, wherein the at least one module when executed on the at least one processor performs further actions that:
   receives a first API call from the first JIT compiler requesting the first input data;
   retrieves additional input data associated with the first input data from the runtime environment not included in the first API call; and
   stores the additional input data.

7. The system of claim 1, wherein the first JIT compiler and the second JIT compiler differ.

8. A method performed on at least one computing device including at least one processor and a memory, the method comprising:
   intercepting a first API call, during a first just-in-time (JIT) compilation of a method of a program, the first API call requesting input data from a runtime environment executing the program, the first API call initiated from a first JIT compiler during the first JIT compilation;

obtaining the input data from the runtime environment for transmission to the first JIT compiler;

upon the first API call meeting a predefined condition, issuing a second API call to the runtime environment for additional input data without initiation from the first JIT compiler, the additional input data pertaining to the method and for use in a subsequent compilation; and storing the input data and the additional input data in a data store accessible through a memory location associated with the first API call, the stored data for use in the subsequent compilation.

9. The method of claim 8, further comprising:

performing a second JIT compilation of the method using a second JIT compiler;

during the second compilation, receiving a second API call requesting the additional input data; and retrieving the additional input data from the data store.

10. The method of claim 8, wherein the input data includes one or more of:

type data of an element used in the method;

a method signature of another method in the method;

debugging information pertaining to the method;

a memory address pertaining to the method;

profile data pertaining to the method; or symbol table data pertaining to the method.

11. The method of claim 8, wherein the predefined condition includes one or more of:

(1) when the first API call is for a method signature, obtain a type of a return value associated with the method signature;

(2) when the first API call is for a method class, obtain a class handle of the method; or (3) when the first API call is to resolve a token, obtain type attributes, a child type and corresponding fields and field offsets of the token.

12. The method of claim 8, further comprising:

accessing the data store for the input data using the input data associated with the at least one parameter from the first API call.

13. The method of claim 9, further comprising:

generating a first native code of the method using the first JIT compiler;

generating a second native code of the method using the second JIT compiler; and comparing the first native code with the second native code to determine differences indicative of a problem with the second JIT compiler.

14. The method of claim 8, further comprising:

returning a default value as the input data when the input data cannot be obtained from the runtime environment.

15. A device, comprising:

at least one processor and at least one memory coupled to the at least one processor;

wherein the at least one processor is configured to:

record input data used in a first JIT compilation of a method of a program in the memory using an identifier representing the method, the first JIT compilation performed by a first compiler, the input data used in the first JIT compilation requested by the first compiler to a runtime environment;

perform a second JIT compilation of the method using a second compiler, the second compiler differs from the first compiler;

receive by a debugging tool a request for input data from the second compiler to perform the second JIT compilation of the method; and provide by the debugging tool, the input data requested by the second compiler, to perform the second JIT compilation of the method, wherein the input data is retrieved from the memory using the identifier representing the method.

16. The device of claim 15, wherein the debugging tool compares a first native code generated from the first JIT compilation with a second native code generated from the second JIT compilation to determine differences between the first native code and the second native code.

17. The device of claim 16, wherein the at least one processor is further configured to:

compare by the debugging tool an instruction and parameter associated with the first native code with a corresponding instruction and parameter in the second native code;

when the parameter of the instruction associated with the first native code differs from the parameter of the instruction in the second native code, determine a difference between an address of the parameter of the instruction in the first native code with the parameter of the instruction in the second native code;

if the difference is same as a difference between base addresses associated with the instruction of the first native code and the instruction of the second native code, the instructions are deemed similar.

18. The device of claim 15, wherein the first compiler includes at least one of a just-in-time compiler (JIT) or an ahead-of-time (AOT) compiler and the second compiler includes at least one of a JIT compiler or an AOT compiler.

19. The device of claim 15, wherein the debugging tool provides the input data requested by the second compiler without regard to a sequence in which the method is executed by the second compiler.

20. The device of claim 15, wherein the identifier is a parameter of the method.

* * * * *